United States Patent [19]

Bolum

[11] 3,736,050
[45] May 29, 1973

[54] HIGH CONTRAST FILTER FOR VISUAL DISPLAYS DOWN-CONVERTING OTHERWISE BLOCKED RADIATION

[75] Inventor: Donald R. Bolum, East Islip, N.Y.

[73] Assignee: A-T-O Inc., Willoughby, Ohio

[22] Filed: July 27, 1970

[21] Appl. No.: 58,568

[52] U.S. Cl. ................. 350/316, 178/7.82, 313/112, 350/164
[51] Int. Cl. .............................................. G02b 5/22
[58] Field of Search .................... 350/316, 276, 164; 178/7.82, 7.85, 7.86; 250/71 R, 76, 108, 86; 313/112

[56] References Cited

UNITED STATES PATENTS

| | | | |
|---|---|---|---|
| 3,330,981 | 7/1967 | Aia | 313/92 R |
| 3,546,460 | 12/1970 | Lally | 350/316 X |
| 3,518,373 | 6/1970 | Cushera et al. | 350/316 X |
| 2,918,670 | 12/1959 | Cusano et al. | 178/7.85 |

OTHER PUBLICATIONS

Ii, L.B., "High–Contrast Filter," IBM Technical Disclosure Bulletin, Vol. 12, No. 10, March 1970, pps. 1709–1710.

Primary Examiner—Ronald L. Wibert
Assistant Examiner—Ronald J. Stern
Attorney—Mahoney, Miller & Stebens

[57] ABSTRACT

A radiation filter device is provided for utilization with visual display apparatus, such as the diffusely-emitting cathode ray tube, for contrast enhancement through substantial elimination of ambient radiation effects. This objective is attained through construction of a unique filter device comprising at least two filter elements. The filter device comprises, in cascaded, superposed relationship, a first filter element consisting of a layer or film of luminescent material having a sharp cut-off, band-pass radiation transmission characteristic disposed immediately adjacent the diffusely-emitting surface of the cathode-ray tube faceplate, a second filter element that is effectively a band-pass filter having a transmission band covering the selected band, and a neutral density filter element providing uniform attenuation to radiation of all useful wavelengths within the source emission spectrum. An anti-reflective coating may also be applied to the exit face of the filter device which is the neutral density filter.

4 Claims, 5 Drawing Figures

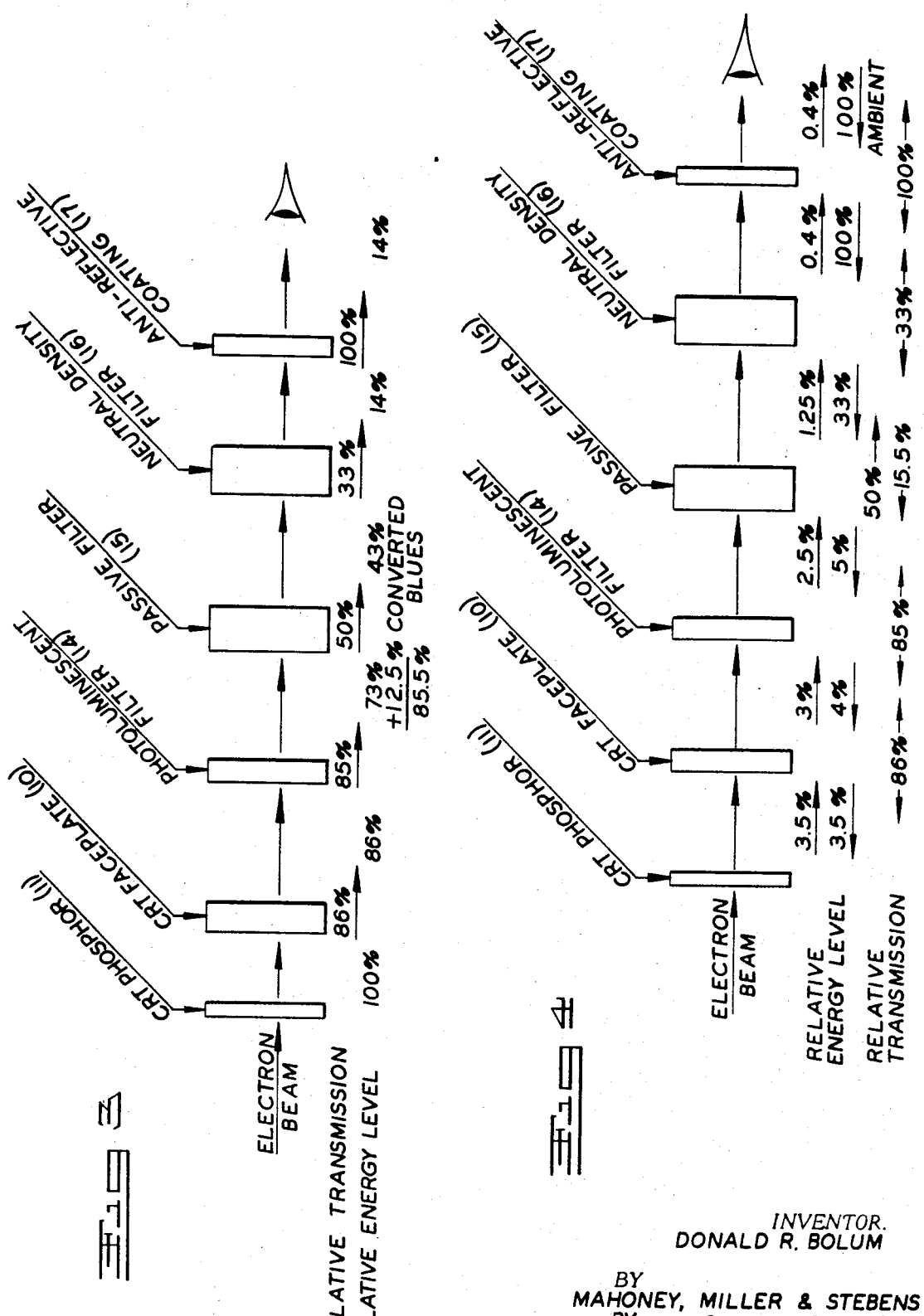

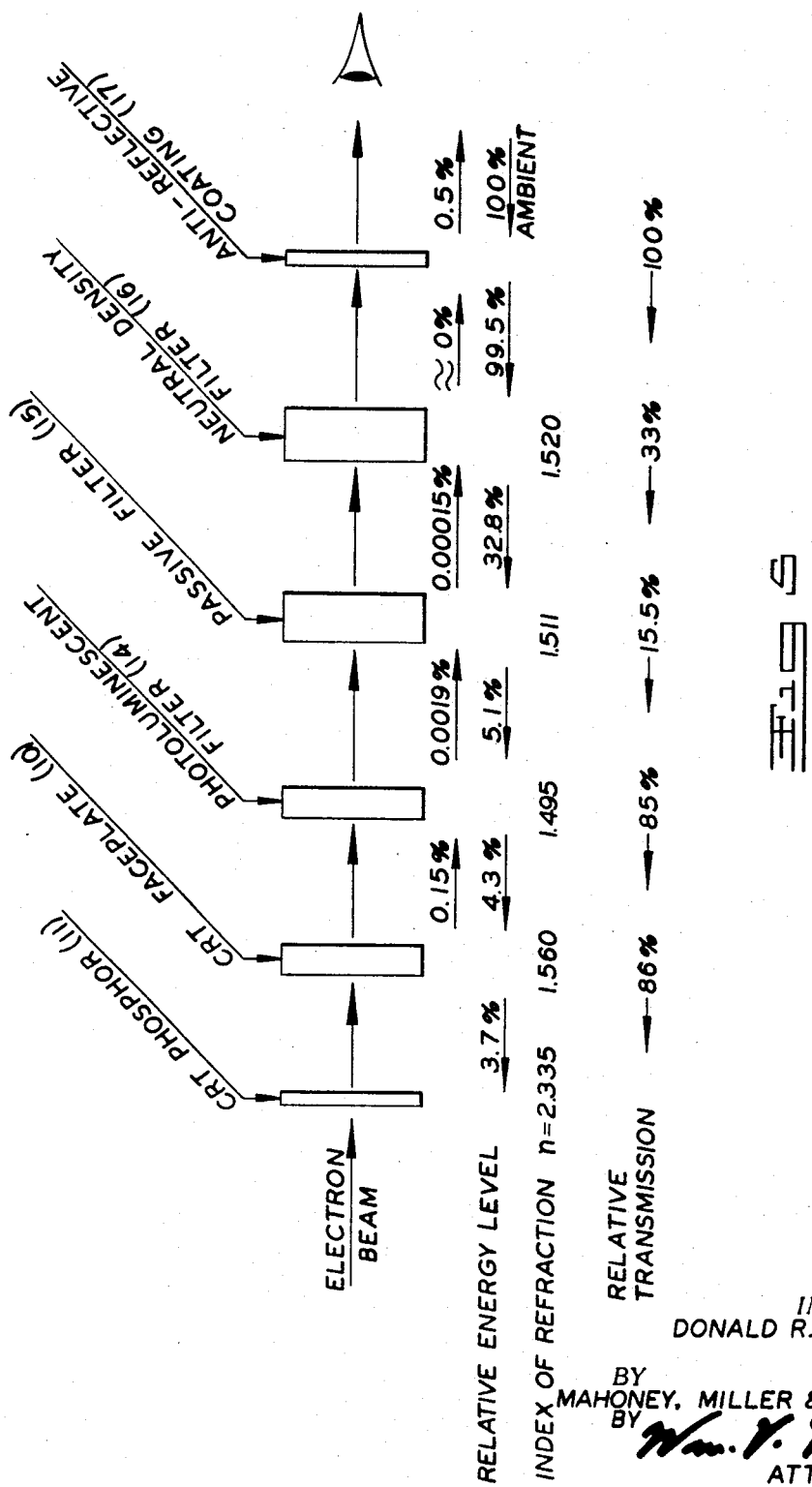

HIGH CONTRAST FILTER FOR VISUAL DISPLAYS DOWN-CONVERTING OTHERWISE BLOCKED RADIATION

BACKGROUND OF THE INVENTION

Various types of radiation filtering apparatus and techniques have been previously developed for enhancement of the display contrast through attempts at eliminating effects of ambient radiation. With respect to cathode ray tube display apparatus, referred to hereinafter as CRT's, that primarily emit in only a single color, green spectrum, ambient radiation which normally includes the green spectrum will seriously degrade the image contrast. The known prior art techniques primarily rely on attenuation filters to reduce the effect of ambient radiation through absorption. This approach usually results in a structure comprising several cascaded passive filter elements which are selected on the basis of their respective radiation transmission characteristics to optimize transmission within the selected wavelength spectrum and to optimize attenuation of radiation of wavelengths not in this spectrum. Since known commercially available passive filter elements do not have sharp cut-off transmission characteristics, this prior art approach does not satisfactorily enhance image contrast as any substantial attenuation of that portion of the ambient spectrum immediately adjacent the desired pass-band will also result in attenuation of the desired image.

BRIEF DESCRIPTION OF THE INVENTION

The radiation filtering apparatus of this invention is designed for utilization with CRT display apparatus and the specifically disclosed embodiment was constructed for direct application to the external surface of the CRT faceplate. A CRT faceplate comprises a glass plate that is substantially flat surfaced, particularly in the major image viewing area, and a cathodoluminescent phosphor layer coating the interior surface of the faceplate. This phosphor is responsive to electrons in an incident electron beam and forms an image in response to the input signal. The first element of the filtering apparatus of this invention, which first element is placed immediately adjacent the CRT faceplate, is an active element comprising a photoluminescent material that acts primarily as a sharp cut-off band-pass filter and secondarily as a converter of at least a portion of the radiation emitted by the CRT that is not within the desired spectrum to radiation of wavelengths within the first filter element pass band and is emitted by the first filter element. Disposed immediately adjacent the outwardly facing side of the photoluminescent material or first filter element is a second or passive filter element having a radiation-optic characteristic to function as a band-pass filter with its pass band preferably coincident with the secondary-emission and transmission or pass-band characteristic of the photoluminescent material forming the first filter element and the emission spectrum of the CRT phosphor. The second filter element substantially prevents transmission of ambient radiation within the absorption spectrum of the photoluminescent material thus materially reducing the effect of ambient radiation. The third element of the illustrated filtering apparatus is a neutral density filter that uniformly attenuates radiation transmission of all wavelengths in either direction positioned at the viewing surface of the filter apparatus giving the viewer a black-appearing surface. An additional or fourth element incorporated in the illustrated filtering apparatus is an anti-reflective coating that further enhances contrast through reduction of specular reflectance.

These and other objects and advantages of this invention will be readily apparent from the following detailed description of an embodiment thereof and the accompanying drawings.

In the drawings:

FIG. 3 is a graphic representation of the radiation transmission characteristics of the composite filter device.

FIG. 4 is a graphic representation of the diffuse reflection characteristics of the composite filter device.

FIG. 5 is a graphic representation of the specular reflection characteristics of the composite filter device.

Figure 1:
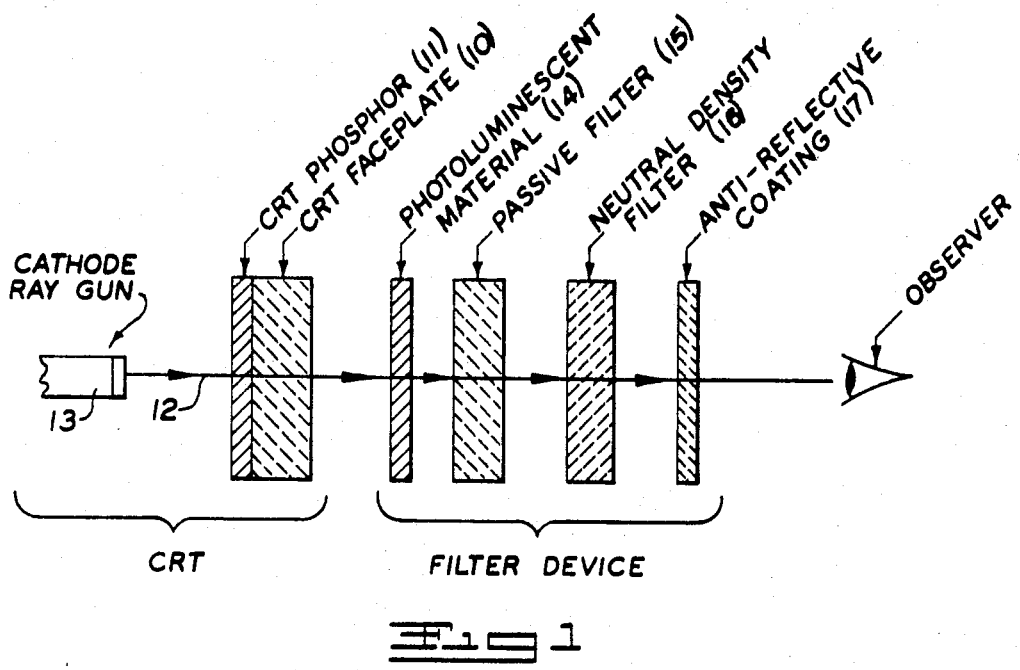
FIG. 1 is a diagrammatic cross-sectional view of a filter device embodying this invention as placed in combination with a cathode-ray tube display device.

Having reference to FIG. 1, an embodiment of this invention is diagrammatically illustrated in relation to a CRT although this specific application is not considered as a limitation of use. For example, the image radiation source could also be an electroluminescent display device rather than a CRT since both are characteristically similar in having a diffusely emitting surface and the image can be of any color with the filter elements being appropriately selected for the particular color. Since the filter apparatus of this invention is concerned only with enhancement of image contrast as to the emitted radiation from a source such as the CRT, the CRT is only diagrammatically shown in cross-section, as is the filter device, to clearly illustrate the operation and functional relationship of the several elements of the filter device in cooperation with the CRT. Accordingly, the CRT is seen to include a faceplate 10 of planar, sheet-form configuration having a layer of cathodoluminescent phosphor 11 formed as a thin film on the internal surface of the faceplate. This phosphor 11 emits light in a characteristic spectral band in response to incident electrons directed toward the layer of phosphor in a beam 12 emitted by a cathode 13 of the CRT gun with the beam controllable in the well known manner to form an image at the faceplate in response to an input signal. These components of the CRT are only symbolically shown as the specific structure of a CRT is not otherwise pertinent to a full description and clear understanding of this invention.

Figure 2:
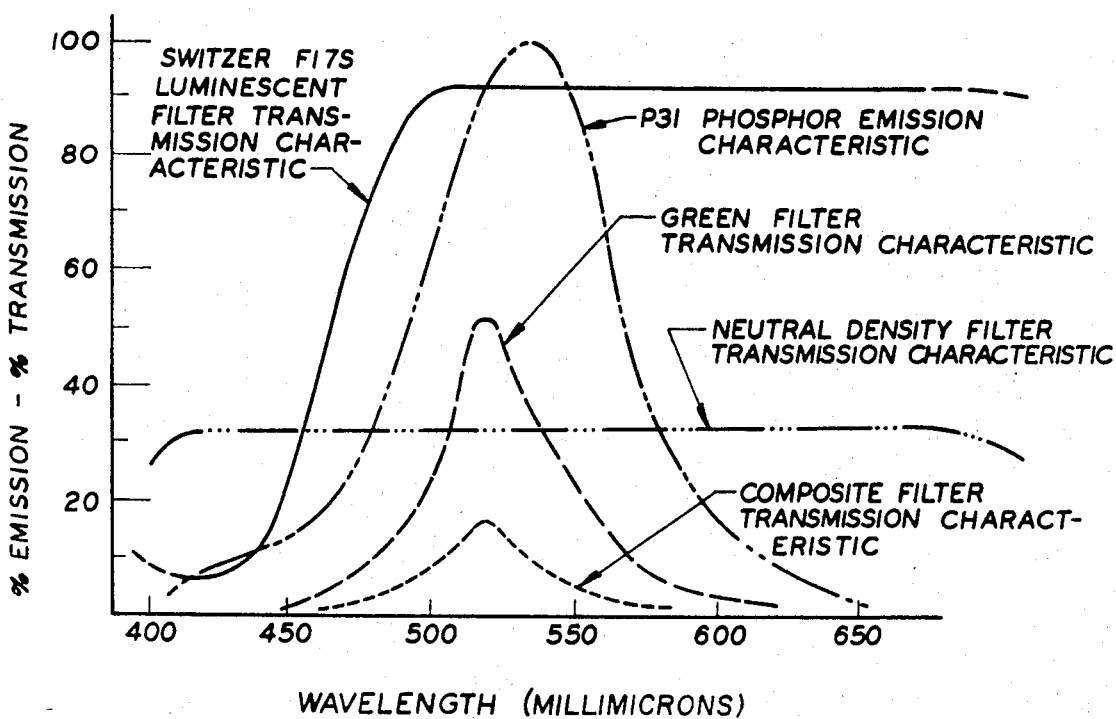
FIG. 2 is a graphic representation of radiation-optic characteristics of the several elements and the composite transmission characteristic of the filter device shown in FIG. 1.

The particular CRT utilized in assembly and testing of this embodiment of the filter device used a P31, green-emitting phosphor having a spectral-energy distribution characteristic graphically illustrated in FIG. 2. The distribution characteristic of this phosphor has a peak at 5,350 A. units which is within the green spectrum of 5,000 to 5,800 A., but is seen to emit radiant energy within the blue spectrum from 4,400 to 5,000 A. The faceplate 10 of this particular CRT is fabricated from Kimble TM-9 glass having a relatively constant transmission characteristic throughout the visible spectrum with the transmission being of the order of 86 percent. This figure is utilized in the graphical illustration of the filter operation in FIGS. 3, 4, and 5.

The illustrated filter device per se comprises four elements designated in FIG. 1 as film of photoluminescent material 14 (first filter element), passive filter (second filter element) 15, neutral density filter (third filter element) 16 and anti-reflective coating (fourth filter element) 17. These elements are either structurally self-supporting sheet-form members or thin-film coatings having a surface area commensurate with that of the CRT faceplate 10 and are arranged in the indicated superposed relationship. The filter device elements are shown in spaced parallel relationship for clarity of illustration, but it will be understood that the several elements are assembled in surface contacting relationship with the assembled filter positioned in closely adjacent relationship to the external surface of the CRT faceplate 10. Details of structure for supporting the assembled filter device in association with the CRT are not illustrated or otherwise described as such construction details are known to those skilled in the art and are not pertinent to a full and complete description and clear understanding of this invention.

In this filter device, the first filter element 14 preferably comprises a thin film of photoluminescent material, which, when excited in response to incident photon energy within a selected wavelength spectrum, emits radiation of relatively longer wavelengths within another spectrum. A desirable transmission characteristic for the photoluminescent 14 which forms an active filter element in the filter device is graphically shown in FIG. 2 and, for the specific material in this embodiment, has a relatively sharp cut off at 4,700 A. The selected phosphor is designated Switzer F17S which passes all radiation of wavelengths above 5,000 A. and either absorbs or reflects all radiation of wavelengths shorter than 4,700 A. Within the absorption band that peaks at 4,300 A., incident photon energy or radiation of wavelengths within the absorption band which effectively extends from about 3,700 to 5,000 A. will result in excitation of the photoluminescent material and emission of radiation at relatively longer wavelengths in a spectral band effectively centered at 5,200 A. It will be noted that the specific CRT phosphor 11, a P31 type, utilized in this embodiment of the filter, emits some light or radiation in the shorter-wavelength, blue spectrum, excitation-spectrum of the Switzer F17S luminescent and that a second function of this filter element 14 is to convert the essentially blue spectrum photon energy to useful green spectrum energy. The amount of blue spectrum photon energy is of the order of 12.5 percent of the total emitted by the CRT phosphor and there is a proportional increase in the output of the green spectrum energy exiting the first filter element 14 since the P 31 emitted green-spectrum radiation is also transmitted by the luminescent material.

The Switzer F17S photoluminescent material, which is an organic material, is mixed in a solution of Acetone, Diacetone Alcohol and this is applied to a substrate in a thin film. For optimum operation of the filter device, the thickness of this luminescent film must be limited to prevent excessive spreading of the image. Incident photon energy is only effective in exciting a very thin layer of film of the luminescent material and the secondary radiation emitted will be directed in all directions from effectively point-spots and, as a consequence, a point image at one side of the luminescent film will be substantially enlarged at the opposite exit surface resulting in image degradation. In view of this factor, it has been found desirable to limit the luminescent film thickness to about 0.0005 inch, which restricts spreading to about one thousandth of an inch.

The second element of the filter device is the passive filter 15. This filter is effectively of a band-pass type and its purpose is to restrict transmission to the green spectrum. A standard Corning green glass No. 4010 is utilized in this embodiment having a transmission characteristic as illustrated in FIG. 2 which is centered at 5,200 A. and well within the desired spectrum. While the image-forming green spectrum energy emitted by the CRT and transmitted by the luminescent filter element 14 is transmitted by the passive filter 15, as is the stimulated emission from the luminescent filter element, those shorter wavelength components of ambient radiation that could stimulate emission from the luminescent material are blocked by this passive filter element. As a result of the operation of the luminescent filter 14 having a sharp cut-off band pass characteristic and the passive filter 15 having a band-pass transmission characteristic that is within the pass-band of the luminescent filter, the image contrast will be enhanced since the transmission through the filter device to an observer has now been restricted to a relatively limited spectrum and ambient radiation of wavelengths that could excite the luminescent material are substantially excluded by the passive filter.

A filter device comprising the wavelength converting luminescent filter 14 that also functions as a sharp cut-off filter and the passive-filter 15 enhances the image contrast although ambient radiation containing a substantial amount of radiation within the desired green spectrum will still tend to degrade the contrast. Ambient radiation usually includes green spectrum components which when incident to the exit surface of the filter would be either reflected at this surface or could be transmitted through the passive filter and be reflected at the luminescent filter surface or also transmitted through the luminescent and reflected at the CRT faceplate surface. Transmission of both ambient and CRT emitted radiation through any of the elements is attended by a degree of attenuation, but this attenuation is greater in the case of ambient radiation since this radiation must traverse each element twice as it must be reflected at a surface and be redirected toward the observer. Thus, it will be seen that where the reflective surface is not the outermost exposed surface, the ambient radiation is subject to double the attenuation effect for each filter element traversed as compared to the image-forming radiation from the CRT. As a consequence of the relatively greater attenuation of incident ambient radiation which reduces the reflected ambient, a filter device comprising these two elements materially enhances the image contrast.

The neutral density filter or third filter element 16 which is positioned next adjacent the passive filter 15 and may be a sheet of glass, provides substantially uniform attenuation of all wavelengths of radiation that traverse the element irrespective of whether that radiation is emitted by the CRT or is ambient radiation incident to the exit face of the filter device. Image contrast is thus further enhanced as the neutral density filter 16 will be effective in attenuating the ambient-green-spectrum radiation to a substantially greater degree than the CRT emitted radiation since the ambient radiation traversing the neutral density filter is subjected to at least double the attenuation effect by traversing twice the filter thickness. Although there is concurrent attenuation of the transmitted CRT image, this attenuation in this particular illustrative embodiment is partially compensated for by the wavelength conversion of the luminescent filter element 14 and, in the case of the normal CRT, the CRT emitted radiation is of an energy level which will not be attenuated to such an extent that the output will be of an insufficient energy level. Location of the neutral density filter 16 in relationship to the passive filter 15 and luminescent filter 14, as illustrated in FIG. 1, also enhances image contrast as the overall screen will appear black to the viewer. Interchange of the relative positions of the passive filter 15 and the neutral density filter 16 would result in a greenish screen with consequent reduction in image contrast although the attenuation effect would remain the same.

In the illustrated embodiment, the neutral density filter 16 was selected with a density of 0.5 which is equivalent to a transmission across the visible spectrum of 33 percent. The transmission characteristic of the neutral density filter is graphically illustrated in FIG. 2 and its effect is also noted in FIGS. 3, 4 and 5. Neutral density filters having other densities may be utilized as may be determined most advantageous for a specific application.

A further improvement in output is obtained through utilization of an anti-reflective coating 17 applied to the surface of the neutral density filter 16 nearest the observer. The technique of anti-reflective coatings is well known and specifics are, therefore, not described further than noting that the material utilized for the coating is selected on the basis of having an index of refraction different from that of the neutral density filter. This is noted in FIG. 5, which graphically portrays the specular reflection characteristics of the illustrated embodiment of the invention and this figure further indicates that the specific material utilized in this embodiment reduced specular reflection at the viewing surface to an average of 0.5 percent across the wavelength spectrum which, in this case, extends from about 4,000 to 7,000 A.

Although the several elements of the filter device are illustrated in FIG. 1 as being relatively separated, this separation is for illustrative clarity and the elements in the actual device were assembled in close contacting relationship. The passive filter 15 and neutral density filter 16 are preferably bonded together by means of an optical cement. An example of a suitable optical cement for this application is a synthetic polyester resin such as is manufactured by Summers Laboratories, Inc. and designated F-65. The luminescent material in the previously described composition forming the filter element 14 and the anti-reflective coating 17 are merely formed on the respective surfaces of the passive filter 15 and the neutral density filter 16. The assembled filter device may be mechanically supported in close, contacting relationship to the outer surface of the CRT faceplate 10.

FIG. 3 graphically illustrates the radiation transfer characteristic through the composite filter in combination with the associative portions of the CRT. The photon energy emitted by the CRT phosphor 11 is considered as the base of 100 percent. Attenuation of this base energy resulting from transmission through the several elements is then noted along with the relative attenuation effect of the respective attenuation effect of the respective elements. The wavelength conversion effected by the luminescent filter 14 for this particular embodiment results in an increase in the green spectrum radiation of about 12.5 percent which is subsequently operated on by the remaining elements. This results in emitted energy in the green spectrum at the filter exit face of about 14 percent that originally emitted by the CRT phosphor 11. The composite forward transmission characteristic of the assembled filter device is graphically shown in FIG. 2.

Diffuse reflection of ambient radiation from the CRT phosphor 11 is also substantially reduced by this filter device as is graphically illustrated in FIG. 4. Again, relative transmission for each element is indicated and it will be noted the relative transmission of the passive filter 15 is different in the two opposite directions. With the ambient radiation incident to the filter exit surface considered as a 100 percent energy level, it will be seen that ambient radiation will also be filtered in transmission through the filter device to be within the green spectrum only and the radiation subject to diffuse reflection at the CRT phosphor 11 is reduced to 3.5 percent and that this amount is reduced to about 0.4 percent at the exit face of the filter.

The advantageous effect of reducing specular reflection was previously mentioned with respect to the anti-reflective coating 17 and this is graphically illustrated in FIG. 5. In addition to the reduction in specular reflection at the viewing surface of the filter device 7 or exit surface of the anti-reflective coating, it will be noted that the attenuating characteristics of the several elements essentially reduces specular reflection from the CRT to a zero value.

The preceeding detailed description of a filter device embodying this invention is directed to a structure utilizing components or elements specifically selected as having optimum characteristics for use with a green emitting CRT. It will be readily apparent that filter devices embodying this invention may also be constructed having components or elements with characteristics that provide optimum results with other spectral bands. Also, as previously indicated, a filter device embodying this invention may be constructed for utilization with display apparatus other than the specifically discussed CRT. For example, it is contemplated that a filter device of this type may be advantageously used with an electroluminescent display panel. The technique of supporting a filter device in association with a visual display device is suggested as being mechanical in view of the particular components utilized in this embodiment; however, it is contemplated that a filter device may be formed on and directly supported by the display device with the particular technique determined by the specific component materials.

It will be clearly seen from the foregoing detailed description of filter devices that a novel filter is provided for substantial enhancement of the image contrast in visual display apparatus. Image enhancement results from the particular element characteristics and the relative physical disposition of the several elements. Image contrast is initially enhanced through combined operation of a luminescent filter having a sharp cut-off, band-pass transmission characteristic and a band pass passive filter having a pass band within the pass band of the luminescent filter through the mechanism of attenuation of radiation of selected wavelengths and through conversion of some initial emitted radiation components to those of relatively longer wavelength.

Further enhancement of image contrast is produced by a neutral density filter which attenuates ambient radiation to a much greater degree than the CRT image radiation since ambient radiation must traverse each filter element twice while the CRT radiation traverses each element only once before exiting the filter device. In addition, a black background screen is provided by the neutral density filter for greater contrast.

Having thus described this invention, what is claimed is:

1. In combination with a phosphor radiation source which diffusely emits at a surface thereof radiation of wavelengths within an emission spectrum of predetermined extent with an emission peak; a high-contrast filter device comprising a plurality of coextensive elements disposed in superposed, cascaded relationship to the emitting surface of the radiation source and including A. a first filter element positioned next adjacent the source emitting surface and consisting of a layer of photoluminescent material which transmits radiation of relatively longer wavelengths in a transmission band with respect to a cut-off point and is responsive to radiation of relatively shorter wavelengths with respect to the cut-off point in a conversion band to convert such radiation to wavelengths that are within the transmission band, the cut-off point being within the source emission spectrum such that the majority and emission peak are within the transmission band and the shorter wavelengths of the emission spectrum not within the transmission band falling within the conversion band B. a second filter element disposed adjacent to said first filter element having a band-pass radiation transmission characteristic which pass-band is included within the transmission band of said first filter element, and C. a third filter element disposed adjacent to said second filter element and remote to said first filter element, said third filter element being a neutral density filter that attenuates all wavelengths of radiation within said predetermined emission spectrum to substantially the same degree.

2. A filter device according to claim 1 which includes as a fourth filter element disposed adjacent said third filter element and remote to said second filter element, an anti-reflective film.

3. A filter device according to claim 1 wherein said photoluminescent material is formed, as a film of a thickness not greater than about 0.0005 inches thereby limiting image spreading.

4. A filter device according to claim 1 wherein said second filter element is a structurally supporting glass and said photoluminescent material is formed as a film on a surface thereof.

* * * * *